United States Patent [19]

Allegro

[11] Patent Number: 4,953,537
[45] Date of Patent: Sep. 4, 1990

[54] BARREL-SHAPED SOLAR ROOFING ELEMENT AND METHOD FOR IT MANUFACTURE

[75] Inventor: Joseph Allegro, Boca Ratan, Fla.

[73] Assignee: Inner Solar Roof System, Inc., Boca Raton, Fla.

[21] Appl. No.: 408,727

[22] Filed: Sep. 18, 1989

[51] Int. Cl.[5] .............................................. F24J 2/04
[52] U.S. Cl. ................................... 126/432; 126/448; 126/DIG. 2; 52/533; 165/116; 165/169; 165/170
[58] Field of Search ......... 126/432, 448, 450, DIG. 2, 126/417, 443; 52/549, 533, 551, 518, 552, 528, 553; 165/116, 168–170

[56] References Cited

U.S. PATENT DOCUMENTS

| | | | |
|---|---|---|---|
| 4,146,014 | 3/1979 | Allegro | 126/DIG. 2 |
| 4,158,357 | 6/1979 | Allegro | 126/DIG. 2 |
| 4,202,319 | 5/1980 | Vinz | 126/DIG. 2 |
| 4,244,353 | 1/1981 | Straza | 126/DIG. 2 |
| 4,273,106 | 6/1981 | Gould | 126/DIG. 2 |
| 4,428,360 | 1/1984 | Cohen | 126/432 |
| 4,428,361 | 1/1984 | Straza | 126/432 |
| 4,454,863 | 6/1984 | Brown et al. | 126/DIG. 2 |

FOREIGN PATENT DOCUMENTS 2650208  5/1978  Fed. Rep. of Germany ... 126/DIG. 2

*Primary Examiner*—James C. Yeung
*Attorney, Agent, or Firm*—Laurence R. Brown

[57] ABSTRACT

A barrel-shaped solar roofing element consisting of a portion of a conical-shaped panel of a material such as PVC plastic formed by injection molding adapted for receiving an impingement of solar energy upon an outer surface thereof and constructed of insulative material having a relatively thin dimension, a passway extending throughout the panel for conduiting a heat exchanger fluid, the passway having a male coupling at one edge of the panel and a female coupling at a generally distal edge of the panel and constituting a fluid circuit, or at least a portion thereof, each of the male coupling and female coupling formed for interlocking with a complementary or mating kind of coupling of an adjacent panel.

21 Claims, 2 Drawing Sheets

BARREL-SHAPED SOLAR ROOFING ELEMENT AND METHOD FOR IT MANUFACTURE

BACKGROUND OF THE INVENTION

1. Field of the Invention

The invention relates to an improved roof mounted panel for collecting solar ray energy and more particularly the invention is directed to a solar energy collection panel element which includes a generally barrel-shaped conic section of molded plastic for focussing solar energy generally toward an internal conduit or passway for water or other heat exchange fluid.

2. Description of the Prior Art

Various prior art solar energy panels and systems and devices, and the like, as well as apparatus and method of their construction in general, are found to be known and exemplary of the U.S. prior art are the following:

Allegro, 4,146,014, Mar. 27, 1979.
Allegro, 4,158,357, Jun. 19, 1979.

Patent No. '014 teaches the concept of using a hidden solar heat exchange fluid system.

Patent No. '357 shows that energy panels may be distributed along the slope of a roof while serving substantially as overlapped shingles.

These patents or known prior uses teach and disclose various types of solar energy panels and devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the present invention is to provide a novel and improved barrel-shaped roofing element so that solar energy radiating onto the panel is directed onto an interior passway thereof containing a heat exchanger fluid.

Another object of the invention is directed further to providing for panel structure easily constructed by injection molding and easily installed on roofs for dual purpose as shingling.

Also an object of the invention is to provide a simple and direct method for the improved construction of a panel having a passway and features for easily installing in a solar energy system.

Another object of the invention is to provide a novel and improved method of making a panel having male and female couplings easily mating with other panels for forming a decorative roof structure.

The barrel-shaped panel construction further provides for a radial component to the panel allowing solar energy react with a greater fluid passage area in the heat exchange circuit structure, as opposed to a flat shingle construction. Also, the barrel-shaped construction, distinguished from a flat shingle construction, provides for better roof insulation, and a decorative system for solar energy collection that doubling acts as shingling. The term "barrel-shaped" as used herein shall mean encompassing a portion of a rounded outer surface exposed to solar rays in a module having more length than breadth, and having substantially closed ends, and may comprise a tapered rounded surface being generally conically disposed along the length. The barrel-shaped surface element acts as a shingle and extends from lateral extensions defining flanged components for overlapping and serving as a shingle receiving roofing nails or the like when applied to a roof. The elements thus matingly couple with adjacent solar roof elements.

The invention further provides a device providing for the collection of solar energy by with a panel with internal liquid flow paths of PVC plastic formed by injection molding adapted for receiving solar energy upon an outer surface thereof through a relatively thin dimension of insulating material. A passway extends throughout the length of the panel elements for passage of a heat exchange mating fluid, the passway having a male coupling and a mating female coupling at opposite ends of the fluid conduit passageway for forming a fluid circuit system.

Other objects and advantages residing in the details of the process and operation thereof will become apparent as more fully hereinafter described and claimed, reference being had to the accompanying drawings forming a part hereof, wherein like numerals refer to like parts throughout.

DESCRIPTION OF A PREFERRED EMBODIMENT OF THE INVENTION

Figure 1:
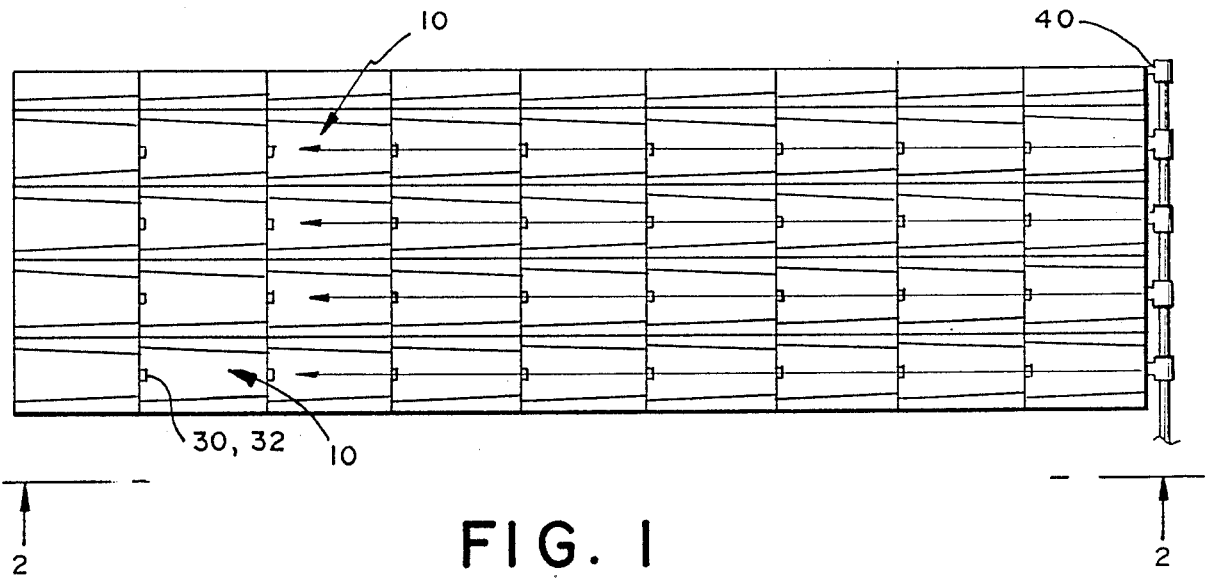
FIG. 1 is a plan view showing as array of barrel-shaped solar roofing elements and illustrating a typical installation of the solar elements as shingles in a solar energy collection system according to a preferred embodiment and best mode of the present invention.

Referring now to the drawings there is shown a solar roofing element or panel 10 of plastic material such as polyvinylchloride (PVC) or the like, and formed by a process such as injection molding. The panel 10 has a configuration such that the panel 10 has a tapered round outer surface of a conical-shape termed a barrel-shaped element downwardly on sloping roofs. The smaller barrel to be installed with a larger end directed end wall 12 thus appears at an upper extremity of each element installed and the larger end wall 14 at a lower extremity. The end walls 12, 14 each possess a knock-out or cut out parts 16a, 16b, 16c, 16d, in the end walls 12, 14 for being severed from the walls 12, 14 as is shown in FIGS. 4A, 4B, 4C, and 4D. These can be used for installing fittings for transfer of fluid in a solar system of interconnected panels, for example.

Figure 3B:
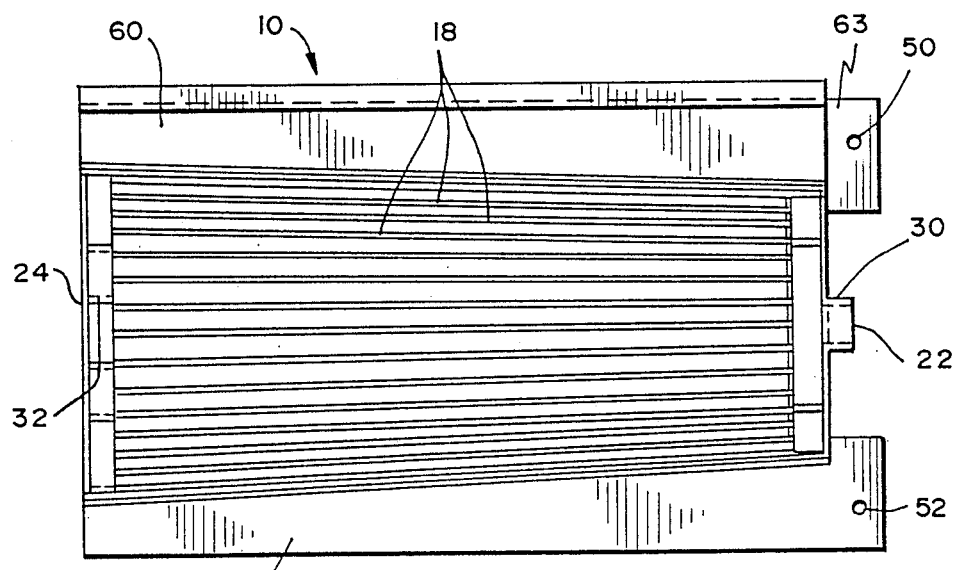
FIGS. 3A, 3B, and 3C, respectively, show a lower end view, a plan view, and an upper end view of a single barrel-shaped solar roofing element embodying the concepts of the invention.
Figure 3A:
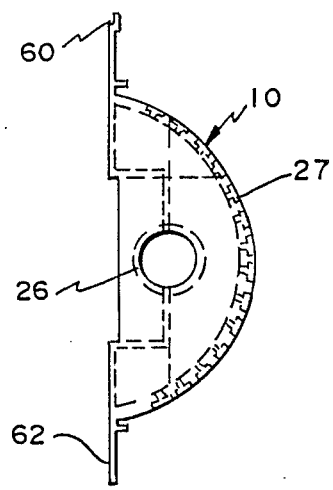
Figure 3C:
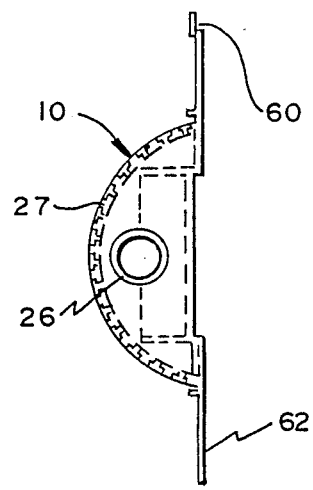
Figure 4A:
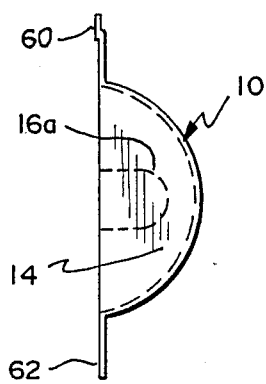
FIGS. 4A, 4B, 4C, and 4D, respectively, show a lower end view, a plan view, and upper end view, and a side view, of a single barrel-shaped solar roofing element having a defined cut-out or knock-out portion thereof.
Figure 4B:
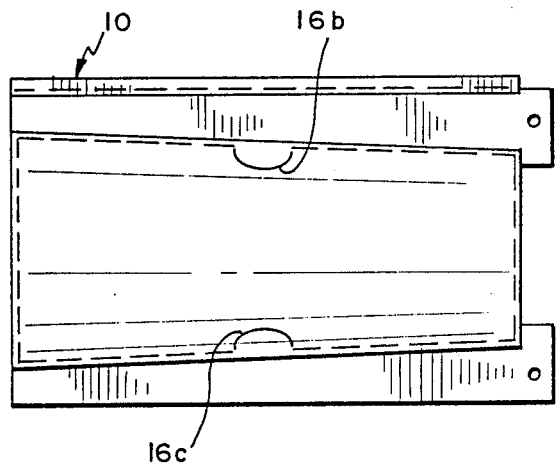
Figure 4C:
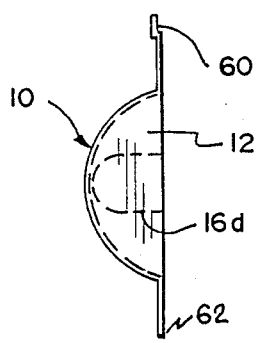
Figure 4D:
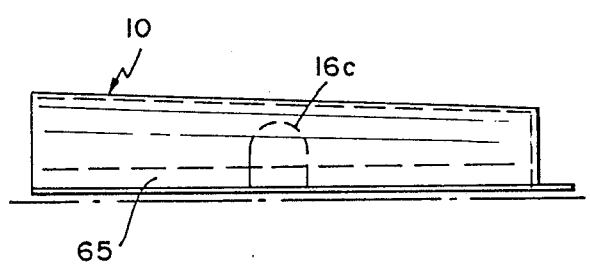

FIGS. 3A, 3B and 3C show in detail that the outer surface of the panel 10 with grooves or ridges 18 along an outer length dimension of the panel 10 for lending strength and rigidity to the structure of the panel 10 but more important to increase the surface area receiving solar radiation energy. In the respective end walls 12, 14 is an aperture or central recess 22, 24 for receiving a pipe or conduit or passway 26 as shown in FIGS. 3A and 3C for providing conduit for a heat exchanger fluid (conventional in nature and not shown). This is preferably molded in at the time the panel element is formed but may be an added commercially available coupling as explained by the FIG. 4 knock-out parts. The conduit or passway 22, 24, 26, 27 passing through and molded into the panel element 10 terminates, for example, though not in limitation thereof, in a male coupling 30 at the upper end wall 12 and in a female coupling 32 at the lower end wall 14.

Figure 2:
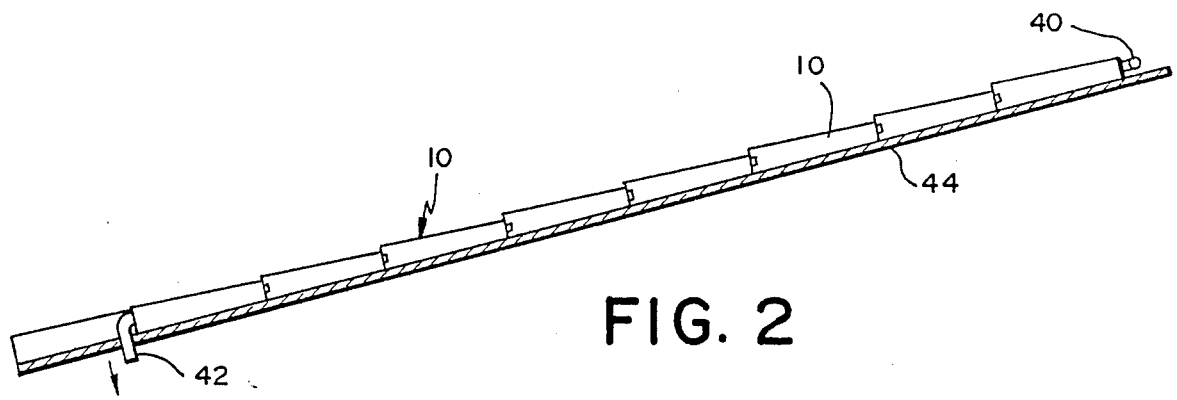
FIG. 2 is a side view of the roofing elements of FIG. 1 taken along lines 2—2.

The panel 10 may be associated with other panels 10 for assembly in a system of solar roofing elements also serving as shingles as shown in FIGS. 1 and 2. The couplings 30, 32 are connected in a mating relation, also shown in FIGS. 1 and 2. Also upper as well as lower ones of the couplings 30, 32 at opposite ends of the roofing system terminate in tee's 40, 42 as illustrated in FIGS. 1 and 2, for connection of the solar heated liquid flow path into a solar energy system of conventional native, not shown.

The panel 10 may be of a color selected as desired, and the outer or exterior of the panel 10 may be copper coated, as is known in the art; FIG. 3B shows how the panel is supported on a roofing structure 44 by nails (not shown) inserted or received in the nail holes 50, 52. Illustrated in FIGS. 3A, 4A, 3C, and 4C are mating construction edge 60 for allowing the adjacent edge 62 to matingly engage therewith in an abutting or overlap joint suitably sealed by glue or tar if used as the primary shingling on the roof.

Inside the barrel, which is hollow, polyurethane foam is preferably as a roof contacting layer introduced as heat insulation for the purpose of keeping the roof cooler, since the hollow barrel may otherwise serve as a heat trap in the presence of penetrating color radiation. The heat trap effect will improve the efficiency of heat transfer in the solar system.

The apparatus of the solar panel 10 of the invention may be so constructed and arranged in its component parts that it may be assembled as a kit or in kit form.

The basic panel element of this invention comprises a tapered barrel having two opposed ends with tapered pipe fittings centralized therein. Between the pipe fittings is a liquid passageway 27 between top and bottom sections of the barrel. This passageway has a thinner cover layer over the top portion of the barrel for more efficient penetration of solar radiation. Overlapping sides and ends 60, 62, 63 permit use in place of shingles in an overlapped panel system. The panel elements 10 may be nailed to a roof like shingles preferably through nail holes 50, 52 molded into the panel ends. The barrel walls are substantially 0.100 inch thick in a preferred embodiment. Outer surface ridges provide strength and additional solar collecting surface area, which coincides with the liquid passageways. Polyurethane insulation layers or filler 65 can be placed or glued inside the barrels after molding. The barrel can be formed of two laminations with the liquid passageway therebetween, with a thinner outer larger to permit solar radiation to penetrate into the liquid passageway more effectively.

The foregoing is considered as illustrative of the principles of the invention. Numerous modifications and changes will readily occur to those skilled in the art without departing from the spirit or nature of the invention, which is defined with particularity in the appended claims.

I claim:

1. A solar roofing element system comprising
    a curved panel portion of plastic formed by injection molding having a liquid passageway therethrough and presenting an outer surface adapted for receiving solar energy constructed generally of insulative material having a relatively thin dimension between the outer surface and the liquid passageway comprising a tapered barrel-shaped construction with a smaller substantially closed end of conic section opposed to a larger substantially closed end of conic section,
    and means for connecting the passageway extending throughout the panel to a solar system for processing heat exchange fluid, including
    a male coupling and a female coupling at opposite ends of the passageway being adapted for interlocking of adjacent panels with the couplings when installed.

2. The system of claim 1 wherein the panel is of PVC.

3. The system of claim 1 wherein the element is of a decorative color.

4. The system of claim 1 wherein the element has flanges extending from the curved surface containing at least two mounting holes for receiving roofing nails.

5. The system of claim 1 wherein a plurality of panel elements have their passageways connected for processing heat exchange fluid in a solar energy system.

6. The system of claim 1 wherein the element is hollow underneath the curved panel portion and a polyurethane foam insulator panel is introduced in the hollow for residing between the element and a roof surface.

7. The system of claim 1 wherein grooves or ridges are formed in the curved panel portion to both enhanced solar heating and strength and rigidity to the structure of the panel.

8. The system of claim 1 wherein panel elements have a longitudinal dimension along two sides of which flanges extend to mate with flanges of adjacent panel elements when installed as shingles on a roof.

9. The system of claim 1 wherein an exterior surface of the panel is copper coated.

10. The method of making solar energy roofing element comprising the steps of
    forming by an injection molding process a plastic element configured to have a curved wall portion having an internal liquid transfer passageway and an outer surface adapted for exposure to solar radiation to heat liquid in the passageway,
    forming flanged elements thereon adapted to fit in shingled arrangement on a roof and
    forming the curved panel portion with a smaller end of conic section disposed downwardly on a tapered barrel-shaped body from a larger end of the conic section.

11. The method of claim 10 further comprising the step of forming substantially closed end walls at opposite ends of the curved portion providing a heat accumulating compartment partially surrounded by the curved wall portion.

12. The method of claim 11 further comprising the step of molding a male coupling and a female coupling in the end walls for interlocking together in a system of end to end panels with a common passageway for conduction of heat transfer liquid through the system.

13. The method of claim 10 including the step of molding the panel from PVC.

14. The method of claim 10 comprising the step of producing the curved panel portion from outer and inner laminations.

15. The method of claim 10 including the step of providing in the flanged elements of the panel at least one mounting hole for a receiving roofing nail.

16. The method of claim 10 including the steps of producing ridges in an outer surface of the curved panel portion with a polyurethane foam layer to insulate the hollow area from a roof on which the element is installed.

17. The method of claim 10 further comprising the steps of providing a hollow area inside said curved panel portion and attaching a polyurethane foam layer to insulate the hollow area from a roof on which the element is installed.

18. A solar roof panel system, comprising molded PVC plastic with tapered barrel-shaped outer surfaces installed on a sloping roof as shingles with a larger tapered end directed downwardly on the roof slope and having a longitudinal liquid passageway through individual elements terminating into interfitting couples for coupling the panel elements end to end.

19. The system of claim 18 having a barrel shape adjacent the liquid passageway extending from a planar footprint surface for presenting a conical area to solar radiation of greater surface area than the footprint surface area.

20. The system of claim 18 interlocked with similar panels in a solar energy collecting system with a liquid flow network.

21. The system of claim 20 installed on a roof with said panel elements as shingles.

* * * * *